US007333824B2

(12) United States Patent
Zhang et al.

(10) Patent No.: US 7,333,824 B2
(45) Date of Patent: *Feb. 19, 2008

(54) METHOD AND APPARATUS FOR SUPPORTING P2P COMMUNICATION IN TDD CDMA COMMUNICATION SYSTEMS

(75) Inventors: Xuejun Zhang, Shanghai (CN); Qunli Jia, Shanghai (CN); Li Sun, Shanghai (CN)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 10/557,967

(22) PCT Filed: May 17, 2004

(86) PCT No.: PCT/IB2004/050721

§ 371 (c)(1),
(2), (4) Date: Nov. 17, 2005

(87) PCT Pub. No.: WO2004/103009

PCT Pub. Date: Nov. 25, 2004

(65) Prior Publication Data
US 2006/0258382 A1 Nov. 16, 2006

(30) Foreign Application Priority Data
May 19, 2003 (CN) ............................. 03 1 23740

(51) Int. Cl.
*H04B 7/00* (2006.01)
*H04B 15/00* (2006.01)

(52) U.S. Cl. ............... 455/502; 455/517; 455/522; 455/509; 455/516; 455/526; 455/428; 455/455; 455/3.05; 455/90.2; 455/90.3; 370/278; 370/280; 370/311; 370/330; 370/335; 370/337; 370/342

(58) Field of Classification Search ............ 455/502, 455/517, 522, 509, 511, 514, 515, 516, 518, 455/519, 526, 415, 416, 428, 455, 3.05, 90.2, 455/90.3; 370/278, 280, 311, 330, 335, 337, 370/336, 342
See application file for complete search history.

(56) References Cited

U.S. PATENT DOCUMENTS 5,423,055 A * 6/1995 Diaz et al. ................. 455/15

(Continued)

FOREIGN PATENT DOCUMENTS

| WO | 2004077919 A2 | 9/2004 |
| WO | 2004077920 A2 | 9/2004 |
| WO | 2004080103 A1 | 9/2004 |
| WO | 2004091238 A1 | 10/2004 |

OTHER PUBLICATIONS

ISR, Written Opinion Of The International Searching Authority PCT/IB2004/050721.

*Primary Examiner*—Matthew Anderson
*Assistant Examiner*—Shaima Q. Aminzay

(57) ABSTRACT

A method performed by a network system is provided for canceling interference signals brought by introducing P2P communication in wireless communication systems, comprising: receiving a call request from a user equipment in a cell for communicating in UP-BASE STATION-DOWN mode; judging whether there is an appropriate link timeslot in the several available timeslots for the user equipment to avoid being interfered by P2P signals transmitted by the chosen user equipments allocated in the appropriate timeslot when the user equipment communicates in the appropriate timeslot, according to the relative position of the user equipment and the chosen user equipments in P2P communication in the cell; approving the call request from the user equipment and allocating the appropriate timeslot to the user equipment if the appropriate timeslot is available.

16 Claims, 8 Drawing Sheets

U.S. PATENT DOCUMENTS

| | | | |
|---|---|---|---|
| 5,636,243 A * | 6/1997 | Tanaka | 375/219 |
| 5,995,844 A * | 11/1999 | Fukuda | 455/462 |
| 6,047,178 A * | 4/2000 | Frlan | 455/423 |
| 6,295,448 B1 | 9/2001 | Hayes, Jr. et al. | |
| 6,415,146 B1 * | 7/2002 | Capece | 455/517 |
| 6,459,690 B1 * | 10/2002 | Le Strat et al. | 370/332 |
| 6,807,165 B2 * | 10/2004 | Belcea | 370/347 |
| 7,079,509 B2 * | 7/2006 | Belcea | 370/330 |
| 7,082,108 B2 * | 7/2006 | Hwang et al. | 370/311 |
| 2002/0085520 A1 * | 7/2002 | Sydon et al. | 370/335 |
| 2003/0092452 A1 * | 5/2003 | Youngs et al. | 455/461 |
| 2006/0160544 A1 * | 7/2006 | Sun et al. | 455/456.1 |
| 2006/0245398 A1 * | 11/2006 | Li et al. | 370/335 |

\* cited by examiner

METHOD AND APPARATUS FOR SUPPORTING P2P COMMUNICATION IN TDD CDMA COMMUNICATION SYSTEMS

FIELD OF THE INVENTION

The present invention relates to a method and apparatus for supporting P2P communication in TDD CDMA(Time-Division-Duplex Code Division Multiple Access) communication systems, and more particularly, to a method and apparatus for reducing signal interference caused to a UE (user equipment) during P2P communication process in TDD-SCDMA communication systems.

BACKGROUND ART OF THE INVENTION

In conventional cellular communication systems, a UE (user equipment) has to communicate with another UE only through the relaying of base stations regardless of the distance of the two communicating UEs. FIG. 1 illustrates the conventional communication mode, wherein UE1 and UE2 interact with each other through the UTRAN consisting of base station transceiver (namely Node B) and RNC, and this communication mode is also called UP-UTRAN-DOWN mode. However, in some cases when the distance between two UEs who are camping in the same cell is very close, it can be a more reasonable way for them to communicate directly, rather than through the relaying of base stations. This method is the so-called peer-to-peer communication, abbr. as P2P.

FIG. 2 illustrates a P2P communication mode. As shown in FIG. 2, the dashed line represents signaling link, the solid line for data link, and the arrowhead for direction of information flow. Only signaling link exists between the UTRAN and the UE, while only data link exists between the two communicating UEs. Let's suppose only resource for maintaining basic communication is needed. If a direct link is taken as a radio resource unit (having fixed frequency, timeslot and spreading code), it can be easily inferred that P2P communication mode only needs two radio resource units to maintain basic communication. If additional signaling cost for management is ignored, P2P communication can save about 50% radio resource than conventional communication mode. Furthermore, the UTRAN still holds control over P2P communication, especially over how to use radio resources, so wireless network operators can easily charge for the radio resources used by P2P communication.

It is commonly accepted that a Time Division Duplex (TDD) air interface is a communication standard that offers a more flexible adaptation to different uplink and downlink traffic requirements. Among existing 3G systems based on TDD communication mode TD-SCDMA (Time Division—Synchronization Code Division Multiple Access) system is the most suitable system for the combination of P2P communication with conventional communication mode, because the same carrier frequency is applied in both uplink and downlink communications, which can simplify the RF (Radio Frequency) module of the UE.

A method and apparatus for establishing P2P communication in wireless communication networks, as described in the patent application entitled "A Method and Apparatus for Establishing P2P Communication in Wireless Communication Networks," filed by KONINKLIJKE PHILIPS ELECTRONICS N.V. on Mar. 7, 2003, application Ser. No. 03119892.9, is suitable to any TDD CDMA communication system including TD-SCDMA systems, and incorporated herein as reference.

A method and apparatus for radio link establishment and maintenance with P2P communication in wireless communication networks, as described in the patent application entitled "A Method and Apparatus for Radio Link Establishment and Maintenance with P2P Communication in Wireless Communication Networks," filed by KONINKLIJKE PHILIPS ELECTRONICS N.V. on Mar. 7, 2003, application Ser. No. 03119895.3, is suitable to any wireless communication system including TD-SCDMA systems, and incorporated herein by reference.

After establishing uplink synchronization with the UTRAN through the same random access procedure as existing TD-SCDMA systems, the UE can establish P2P direct link with another UE, in accordance with the method and apparatus as described in the application document whose application Ser. No. is 03119892.9, i.e.: allocate relevant dedicated resource for two P2P UEs. Then, direct link between the two UEs can be established and maintained in accordance with the method and apparatus as described in the application document whose application serial number is 03119895.3, so that the two UEs can receive and transmit P2P signals in the allocated timeslots respectively, and thus P2P communication between two UEs can be implemented.

In a TD-SCDMA system capable of employing P2P communication mode, DIRECT mode is introduced to describe the direct communication between two UEs, besides two other working modes—IDLE mode and CONNECT mode as defined in conventional TD-SCDMA system. The communication link in direct mode can be defined as FORWARD link (e.g.: the link from UE1 to UE2) and BACKWARD link (e.g.: the link from UE2 to UE1) identified by the information flow direction for one UE to send signals to the other UE or receive signals from the other UE. Because P2P communication mode is built in combination with existing TD-SCDMA systems, the UTRAN, the P2P communicating UEs and other conventional UEs allocated in the same timeslot can overhear the information transferred on the FORWARD link or BACKWARD link, i.e.: P2P communication changes the UP-UTRAN-DOWN mode in conventional TD-SCDMA systems. From the view of the UTRAN, even though the UEs have no connection with the UTRAN, the FORWARD link and BACKWARD link are associated with a certain uplink timeslot and/or downlink timeslot (the FORWARD link and BACKWARD link can correspond to different uplink timeslot and/or downlink timeslot depending on different resource allocation schemes). Hence, P2P communication will cause signal interference to conventional communication. Similarly, two P2P communicating UEs can also overhear the information transferred in the uplink timeslot or downlink timeslot associated with their FORWARD link or BACKWARD link during P2P communication. Therefore, when conventional links share the same timeslots with P2P link, conventional uplink or downlink communication will interfere with the P2P FORWARD link or BACKWARD link communication, which seriously deteriorates the performance of P2P-enabled TDD CDMA communication systems.

To improve the performance of P2P-enabled TDD CDMA communication systems, it's necessary to effectively reduce the signal interference caused by introducing P2P communication mode to the TD-SCDMA communication systems.

First of all, an analysis will go to the interference signals brought by introducing P2P communication mode in the following, and then how to reduce interference signals will be described. For simplicity, the timeslot in which one UE transmits signals to the other UE through the above FORWARD link or BACKWARD link is called transmit timeslot (Tx timeslot), while the timeslot in which the UE receives signals from another UE through the above FORWARD link or BACKWARD link is called receive timeslot (Rx timeslot), wherein the Tx timeslot and the Rx timeslot are respectively associated with an uplink timeslot and/or downlink timeslot in the sub-frame in conventional communication.

1. Interference Associated with Uplink Timeslot Between P2P Link and Conventional Link FIG. 3 illustrates the interferences between P2P link and conventional link in P2P-enabled TD-SCDMA systems when the P2P link is associated with uplink timeslot. As shown in FIG. 3, it is assumed that UE1 and UE2 work in P2P mode and UE3 works in conventional mode, wherein UE1's Tx timeslot is associated with UE3's uplink timeslot, that is, UE1 and UE3 are allocated in the same uplink timeslot to transmit signals respectively to UE2 and the UTRAN. S1 is the information from UE1 to UE2 through direct link (taken as FORWARD link) and S2 is uplink information transmitted to the UTRAN via uplink from UE3, moreover, both S1 and S2 are associated with the same uplink timeslot but with different spreading codes.

In TD-SCDMA communication systems, one of the most important features is to maintain uplink synchronization, which means signals from different UEs should arrive at the UTRAN at the same time to guarantee the orthogonality of the spreading codes of signals from the main paths of different UEs. In this way, the system performance can be improved greatly by some advanced receiver algorithms and the computational complexity for the algorithms can be reduced greatly.

For conventional communication systems, the UTRAN is involved in every proceeding communication procedure as information source, destination or relayer, so it can monitor and control the UE' uplink transmitting time according to a specific traffic burst structure in CONNECT mode, and thus maintain uplink synchronization for each UE. But for P2P communication mode, the UTRAN is only involved in link establishment procedure and not involved in the P2P communication procedure afterwards. Therefore, during P2P communication, there is no dedicated channel between the UTRAN and the two P2P UEs, and the UTRAN can't adjust the synchronization advance of the two P2P UEs transmitting signals by using specific traffic burst to maintain uplink synchronization even if it can overhear and estimate the uplink synchronization shift of the two P2P UEs.

Referring to FIG. 3, when UE1 and UE3 transmit signals in the same uplink timeslot, the UTRAN can overhear information S1 transferred from UE1 to UE2 (to the UTRAN, S1 is considered as interference signal I1). But as described above, there is no dedicated channel between the UTRAN and UE1, so the UTRAN can't adjust UE1's transmission time by using the traffic burst in conventional communication mode even if it can overhear information S1 and estimate UE1's synchronization shift information, which means UE1 working in P2P mode may lose uplink synchronization with the UTRAN (UE3 working in conventional mode can maintain uplink synchronization with the UTRAN in conventional way). In another word, I1 and S2 are likely to arrive at the UTRAN unsynchronously, which will potentially impair uplink synchronization and thus degrade the system performance.

Similarly, when UE1 and UE3 transmit signals in the same allocated uplink timeslot, UE2 can also overhear signal S2 transferred from UE3 to the UTRAN (to UE2, S2 is considered as interference I2), and interference signal I2 will also produce impact on UE2 to receive S1, which may potentially impair the P2P communication quality.

2. Interference Associated with Downlink Timeslot Between P2P Link and Conventional Link FIG. 4 illustrates the interferences between P2P link and conventional link in a P2P-enabled TD-SCDMA system when the P2P link is associated with downlink timeslot. As shown in FIG. 4, it is assumed that UE1 and UE2 work in P2P mode and UE3 works in conventional mode, wherein UE1's Rx timeslot is associated with UE3's downlink timeslot, that is, UE1 and UE3 are allocated in the same downlink timeslot to respectively receive signals from UE2 and the UTRAN. S3 is the P2P link information from UE2 to UE1 via direct link (taken as BACKWARD link) and S4 is downlink information from the UTRAN to UE3 via downlink, furthermore, both S3 and S4 are associated with the same downlink timeslot but with different spreading codes.

In FIG. 4, the downlink information S4 transmitted from the UTRAN to UE3 may produce interference to other UEs who share the same downlink timeslot with UE3 but use different spreading codes to receive signals. Such interference is called multi-access interference (MAI).

Referring to FIG. 4, when UE1 and UE3 are allocated in the same downlink timeslot to receive signals, UE1 can overhear information S4 transferred from the UTRAN to UE3 via downlink (to UE1, S4 is considered as interference signal I4), and generally the transmission power of signals from the UTRAN is relatively strong, so interference signal I4 is likely to impair the direct communication quality seriously.

Similarly, when UE1 and UE3 are allocated in the same downlink timeslot to receive signals, UE3 can also overhear information S3 transferred from UE2 to UE1 (to UE3, S3 is considered as interference signal I3, and meanwhile UE2 can be taken as the pseudo-UTRAN), and the interference signal I3 will impair the communication quality of UE3 near UE2 and other UEs in the same timeslot to receive signals as UE3.

3. Interference Between P2P Direct Link Pairs

FIG. 5 illustrates the interferences between two P2P direct link pairs in a P2P-enabled TD-SCDMA system, wherein a UE in one of the two P2P link pairs receives or transmits signals to the UE in another P2P link pair. Assume that UE1 and UE2 work in one P2P link pair while UE3 and UE4 in another P2P link pair.

Because P2P link pairs are symmetrical, signal S5 or S6 from UE1 to UE2 will become interference I5 or I6 to UE4 who is receiving signals from UE3 in associated timeslot. Obviously interference I5 or I6 may also greatly impair the direct communication quality.

As noted above, after P2P link is introduced in conventional TD-SCDMA systems, there exist 6 possible interference signals I1, I2, I3, I4, I5 and I6. Depending on whether the UTRAN is involved, the above 6 interference signals can be divided into two types. The first type includes interferences between the UEs, such as I2, I3, I5, and I6; and the second type includes interferences with UTRAN involved, such as I1 and I4.

To guarantee the communication quality of a P2P-enabled TD-SCDMA communication system, effective methods needs to be researched to cancel the above 6 interferences (it's better to achieve that without changing the physical layer structures of existing communication systems).

Regarding to interference signal I1 of the first type, two methods and apparatuses for canceling interference signal I1, are respectively elaborately described in the patent application document entitled "A Method and Apparatus for Uplink Synchronization Maintenance with P2P Communication in Wireless Communication Networks", filed by KONINKLIJKE PHILIPS ELECTRONICS N.V. on Mar. 7, 2003, application Ser. No. 03119894.5, and another copending patent application document entitled "A Method and Apparatus for Uplink Synchronization Maintenance with P2P Communication in Wireless Communication Networks", filed by KONINKLIJKE PHILIPS ELECTRONICS N.V. application Ser. No. 10/547,586and incorporated herein as reference.

As for interference signal I4 of the first type, a method and apparatus for canceling interference signal I4, is elaborately described in the patent application document entitled "A Method and Apparatus for Supporting P2P Communication in TDD CDMA Communication Systems", filed by KONINKLIJKE PHILIPS ELECTRONICS N.V. on Apr. 14, 2003, application Ser. No. 03110415.0, and incorporated herein as reference.

As for interference signals I2, I3, I5 and I6 of the second type, collectively called Iaj, they can be reduced or cancelled by effectively limiting the radio range supported by P2P communication and adopting intelligent radio resource control scheme. Considering the limited P2P radio range, this invention proposes a scheme for canceling interference signal Iaj. This scheme can reduce interference signal Iaj by obtaining the mutual interference situation between a P2P UE and other UEs in the same cell (for example through position information) and allocating different timeslots to the P2P UE and its adjacent UEs.

SUMMARY OF THE INVENTION

The object of the present invention is to provide a method and apparatus for supporting P2P communication in TDD CDMA communication systems, so as to reduce interferences caused by introducing P2P communication mode into TDD CDMA communication systems.

To achieve the above object, a method is proposed for canceling interference signals caused by introducing P2P (Peer to Peer) communication, performed by a network system in wireless communication systems in accordance with the present invention, comprising: (i) receiving a call request from a UE for communicating in UP-UTRAN-DOWN mode in a cell; (ii) judging whether there is at least one suitable link timeslot in the several available timeslots for the UE to avoid being interfered by P2P signals transmitted by the said chosen UEs allocated in the suitable timeslot when the UE communicates in the suitable timeslot, according to the relative position of the UE and chosen P2P communicating UEs in the cell; (iii) approving the call request from the UE and allocating the suitable timeslot to the UE if the suitable timeslot is available.

To achieve the above object, another method is proposed for canceling interference signals caused by introducing P2P (Peer to Peer) communication, performed by a network system in wireless communication systems in accordance with the present invention, comprising: (I) receiving a call request for communicating in P2P communication mode with the other UE from a UE in a cell; (II) judging whether there are at least two suitable timeslots in the several available timeslots for the UE and the other UE to avoid producing interference of P2P signals to chosen UEs already allocated with radio resources in the suitable timeslots, when the UE and the other UE are communicating in P2P mode in the suitable timeslots, according to the relative position of the UE and the other UE and said chosen UEs already allocated with radio resources in the cell; (III) approving the call request from the UE and allocating said suitable timeslots to the UE and the other UE if there exist said suitable timeslots.

BRIEF DESCRIPTION OF THE ACCOMPANYING DRAWINGS

DETAILED DESCRIPTION OF THE INVENTION

According to the above analysis of interference signals in a P2P-enabled TD-SCDMA communication system, the present invention primarily focuses on reducing interference signal Iaj, that is, the problem of interference signals between UEs after P2P communication mode is introduced.

Iaj exists between a P2P UE and other UEs that are allocated in the same cell and within the radio range of the P2P UE. To reduce interference signal Iaj, the range between these UEs can be increased so that other UEs allocated in the same timeslot as the P2P UE go out of the radio range of the P2P UE and thus avoid being interfered by P2P signals. But it is often very difficult to control the distance between two UEs within a certain range in practical communications due to the randomicity of communication time and location. So, for UEs who falls within a certain range, it can be a more effective solution to reduce interference signal Iaj by allocating different timeslots.

A detailed description will be given below to the method provided in the present invention for reducing interference signal Iaj in conjunction with accompanying drawings, taking TD-SCDMA system as an example.

Figure 6:
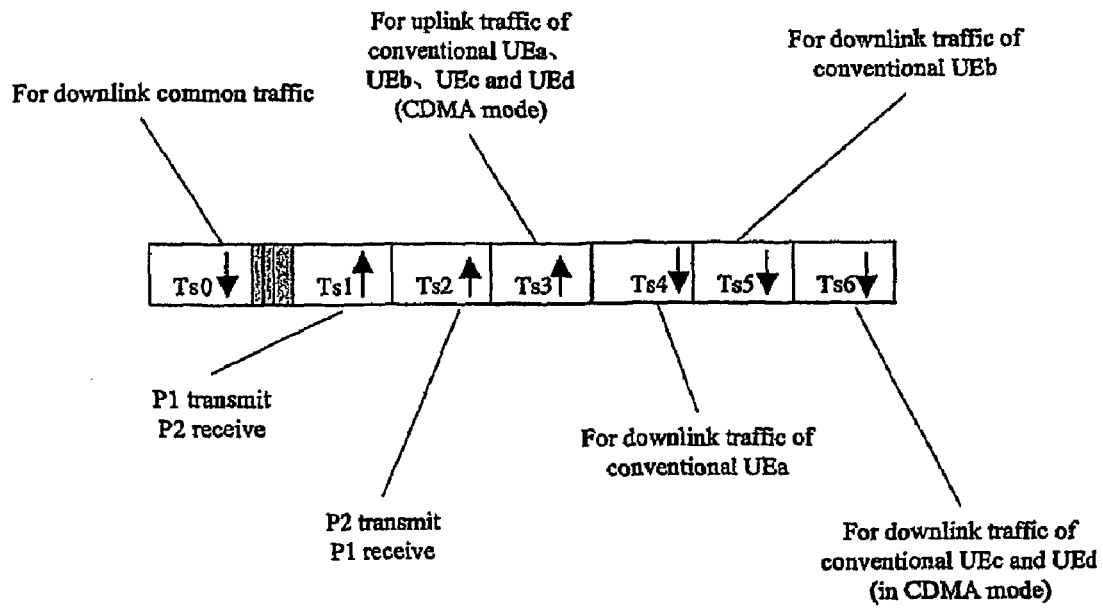
FIG. 6 is a schematic diagram illustrating timeslot allocation in accordance with the first method of the present invention.

FIG. 6 illustrates the timeslot allocation map for reducing interference signal Iaj by adopting the first method in the present invention. In the example shown in FIG. 6, there are a pair of P2P UEs P1 and P2, and four UEs employing conventional UP-UTRAN-DOWN communication mode UEa, UEb, UEc and UEd. The timeslot allocation is shown in FIG. 6. In a sub-frame composed of 6400 chips and with time length as 5 ms, Ts0 is for downlink common traffic, Ts1 for P2P UE's forward traffic (P1 transmit, P2 receive), Ts2 for P2P UE's backward traffic (P2 transmit, P1 receive), Ts3 for uplink traffic of CDMA mode based UEa, UEb, UEc and UEd who employ conventional UP-UTRAN-DOWN communication mode, Ts4 for downlink traffic of UEa employing conventional communication mode, Ts5 for downlink traffic of UEb employing conventional communication mode, and Ts6 for downlink traffic of CDMA-based UEc and UEd who employ conventional communication mode. In the method shown in FIG. 6, the essence of the method is: for two timeslots occupied by a pair of P2P UEs, such as Ts1 and Ts2 in FIG. 6, no other pair of P2P UEs and other UEs employing conventional communication mode are allocated in. That is, the timeslots occupied by forward link and backward link of P2P link, are occupied exclusively by two P2P communicating UEs.

The timeslot allocation method as shown in FIG. 6, is easy to be implemented. But the timeslots occupied by P2P UEs can't be shared with other UEs by adopting CDMA mode, so the whole system has actually been changed into a communication mode with pure TDMA, which greatly reduces capacity of the communication system. Therefore, a more intelligent timeslot allocation method is needed to reduce interference Iaj between UEs allocated in a same timeslot, as well as continue to use CDMA mode, and thus enlarge system capacity effectively.

Figure 7:
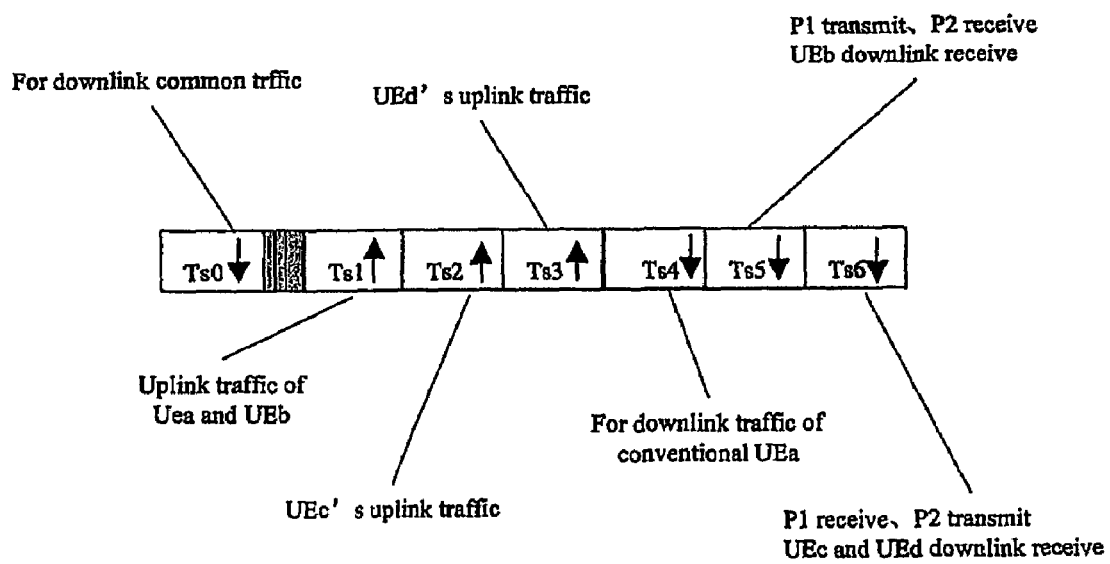
FIG. 7 is a schematic diagram illustrating timeslot allocation in accordance with the second method of the present invention.

FIG. 7 illustrates the timeslot allocation map for reducing interference signal Iaj by adopting the second method in the present invention. In the second method, a P2P UE can share a timeslot with other UEs by CDMA mode, but it should be guaranteed that no radio signal interference will be produced between the P2P UE and other UEs allocated in the same timeslot, otherwise the sharing can't be achieved. To put it more clearly, if the P2P UB Py can share a timeslot by CDMA mode with UEx who can be a UE in conventional communication mode or a UE employing P2P communication mode, when one of Py and UEx is transmitting signals while the other is receiving signals, the UE that is transmitting signals won't produce interference to the other UE that is receiving signals to receive signals correctly. That is, in this timeslot, if Py is in Tx state and UEx in Rx state, UEx won't be interfered by Py when receiving signals; similarly, in this timeslot, if UEx is in Tx state and Py in Rx state, Py won't be interfered by UEx when receiving signals.

In summary, the essence of the second method in the present invention lies in that: if a UE falls within the radio range of another P2P UE, they have to be allocated in different timeslots in order to reduce interference Iaj caused by P2P communication; if a UE is far away from another P2P UE, on condition that it won't be interfered by the P2P UE, the two UEs can share a same timeslot by CDMA mode (i.e.: one UE is in Tx state while the other is in Rx state), thus to enhance system capacity.

According to the timeslot allocation requirement in the second method, when a UE camping in the cell sends a call request (the request can be one for communicating in P2P mode or one for communicating in conventional UP-UTRAN-DOWN mode) to the base station, the base station system sends a paging message to the called UE depending on the information about the called UE contained in the request, and receives an ACK message from the called UE afterwards. During this process, the base station system can obtain the position information about the calling UE and the called UE according to the information included in the call request and the ACK message; and also can test the calling UE and the called UE, and obtain the position information about the calling UE and the called UE according to the information from the calling UE and the called UE.

Then, the base station system calculates the distance between each P2P communicating UE and other communicating UEs according to the position information of each UE, to determine whether the distance exceeds the radio range for the P2P UE to send P2P signals. If it's determined that the distance exceeds the P2P radio range, the UE and the P2P UE can share a same timeslot to perform their respective communication. If the distance doesn't exceed the P2P radio range, the UE and the P2P UE have to be allocated in different timeslots to perform their respective communication.

Obviously, the timeslot allocation in the second method is more complicated than that in the first method. But with the second method, a P2P UE and another UE between which the distance exceeds the P2P radio range, can utilize a same timeslot to perform their respective communication by adopting CDMA mode. So radio systems adopting the second method to allocate timeslots can achieve remarkably greater capacity than those adopting the first method.

In the above second method as described, a UE can be classified into two sets according to whether the distance between the UE and a P2P UE Pi exceeds the radio range of the P2P UE. If the distance between the two UEs exceeds the radio range of the P2P UE, the UE belongs to UEs not suffering from P2P interference and can be categorized in the sharable set Ypi that can share the same timeslot with Pi. Otherwise, the UE belongs to UEs suffering from the P2P interference and should be categorized in the unshared set Xpi that can't share the same timeslot with Pi. Of course, both Xpi and Ypi don't include another P2P UE $P_{i+1}$ that is performing P2P communication with $P_i$.

FIG. 7 illustrates the timeslot allocation in a TD-SCDMA sub-frame, wherein, each timeslot include UEs without P2P interference and UEs with P2P interference, according to the requirement of the above second method. As FIG. 7 shows, in a sub-frame composed of 6400 chips and with time length as 5 ms, assume that there exist only a pair of P2P UEs P1 and P2, four conventional UEs UEa, UEb, UEc and UEd, moreover, $X_{P1}$={UEa}, $Y_{P1}$={UEb, UEc, UEd}, $X_{P2}$={UEa, UEb } and $Y_{P2}$={UEc, UEd}. The timeslots can be allocated as: Ts5 for P1 to transmit, P2 to receive and UEb to downlink receive; Ts6 for P1 to receive, P2 to transmit and UEc and UEd to downlink receive; Ts4 for UEa to downlink receive; Ts0 for downlink common traffic; Ts1 for UEa and UEb's uplink traffic; Ts2 for UEc's uplink traffic; and Ts3 for UEd's uplink traffic.

Figure 4:
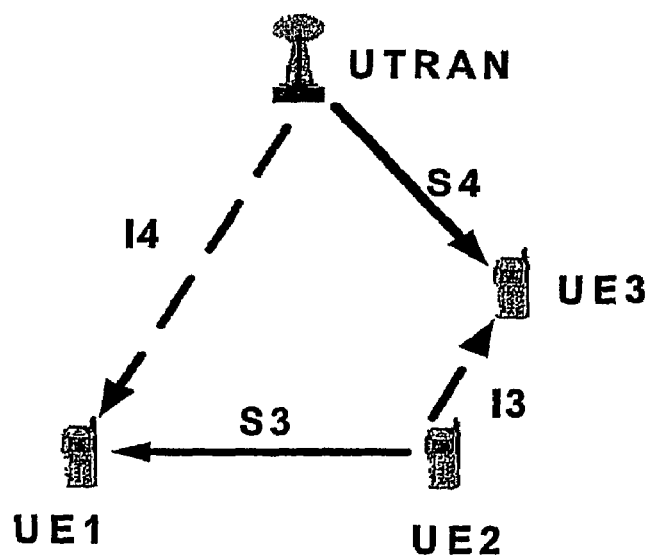
FIG. 4 is a schematic diagram illustrating the generation of interference signals between direct link and conventional link employing downlink timeslot to communicate in a P2P-enabled TD-SCDMA system.

In the following, further description will be given to the timeslot allocation in the above second method by taking FIG. 4 as example. As described above, in FIG. 4, UE1 and UE2 are a pair of P2P UEs communicating in P2P mode, while UE3 is a conventional UE communicating in conventional mode. The base station system calculates whether the distance between UE2 and UE3 exceeds the radio range for UE2 to transmit P2P signals, according to the position information about UE2 and UE3. If the distance between UE2 and UE3 exceeds the radio range for UE2 to transmit P2P signals, UE1 and UE3 can be allocated in a same timeslot to respectively receive information S3 from UE2 and information S4 from the base station system. Signals transmitted by UE2 can't arrive at UE3, so UE3 can avoid being interfered by the P2P signal I3 from UE2.

Figure 1:
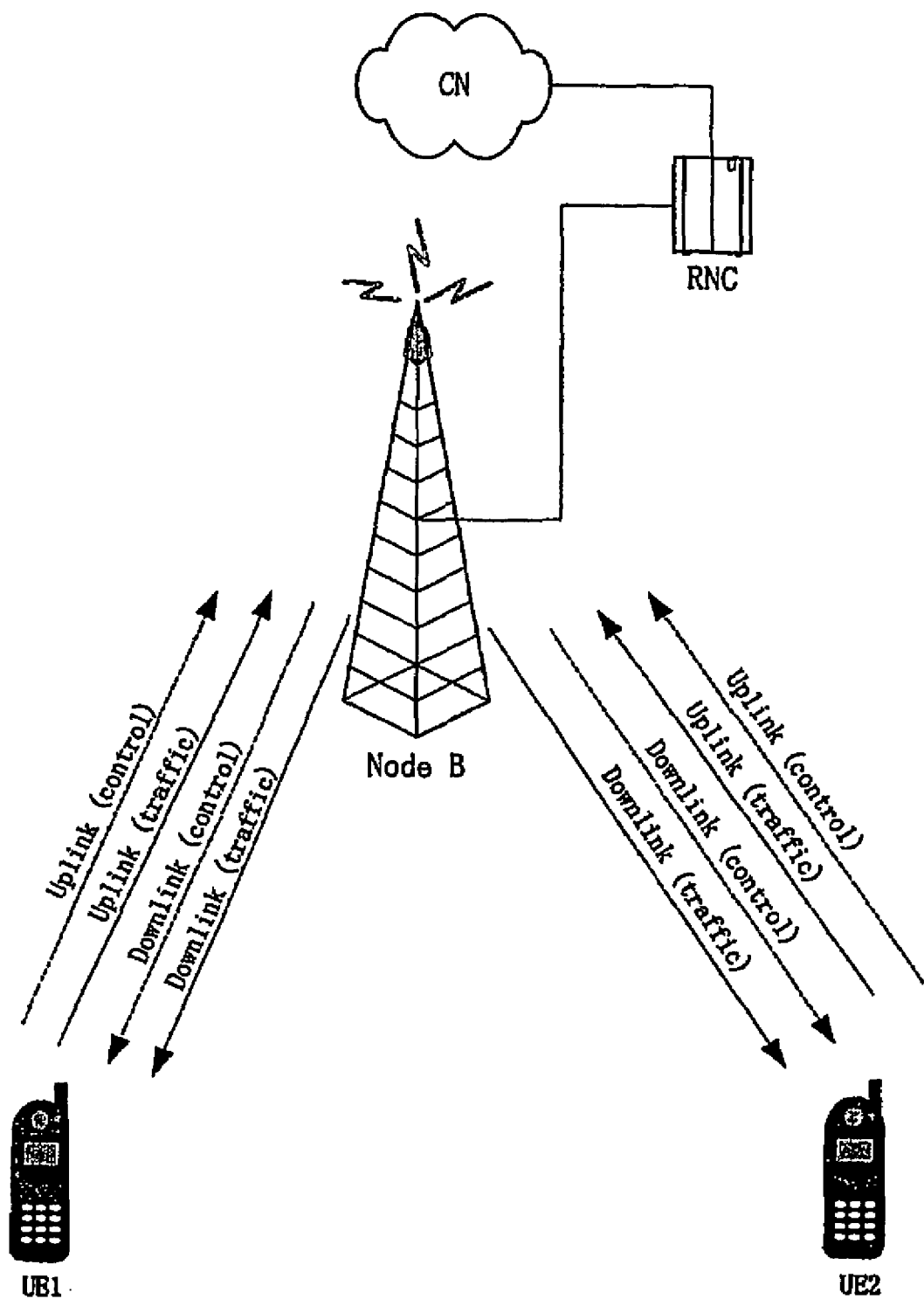
FIG. 1 is a schematic diagram illustrating conventional communication mode in which two UEs communicate through the relaying of base stations.
Figure 2:
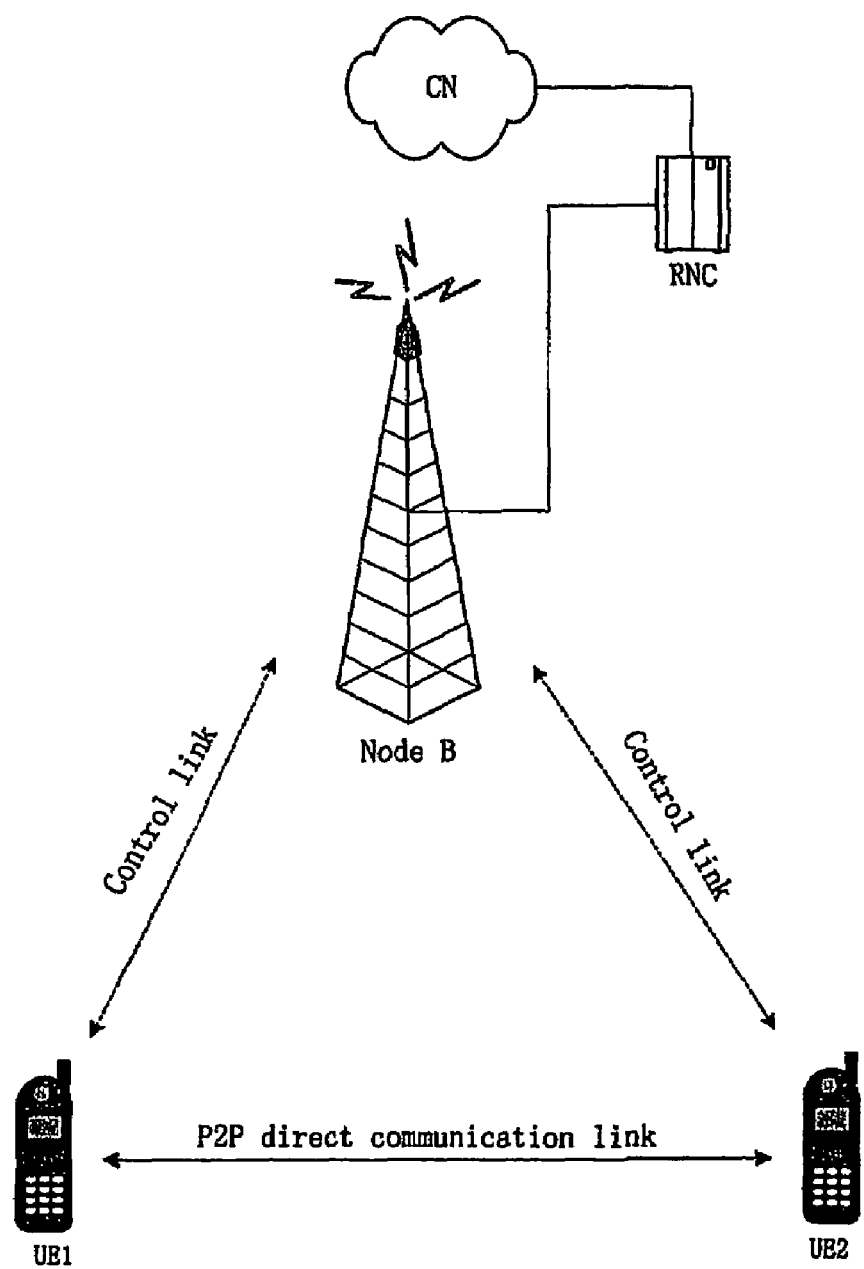
FIG. 2 is a schematic diagram illustrating the P2P communication between two UEs.
Figure 3:
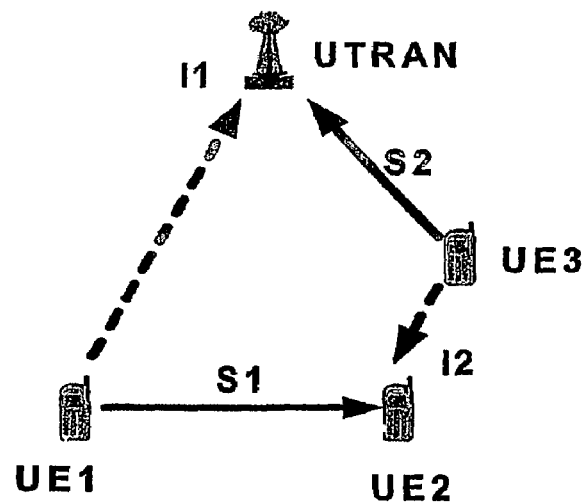
FIG. 3 is a schematic diagram illustrating the generation of interference signals between direct link and conventional link employing uplink timeslot to communicate in a P2P-enabled TD-SCDMA system.
Figure 5:
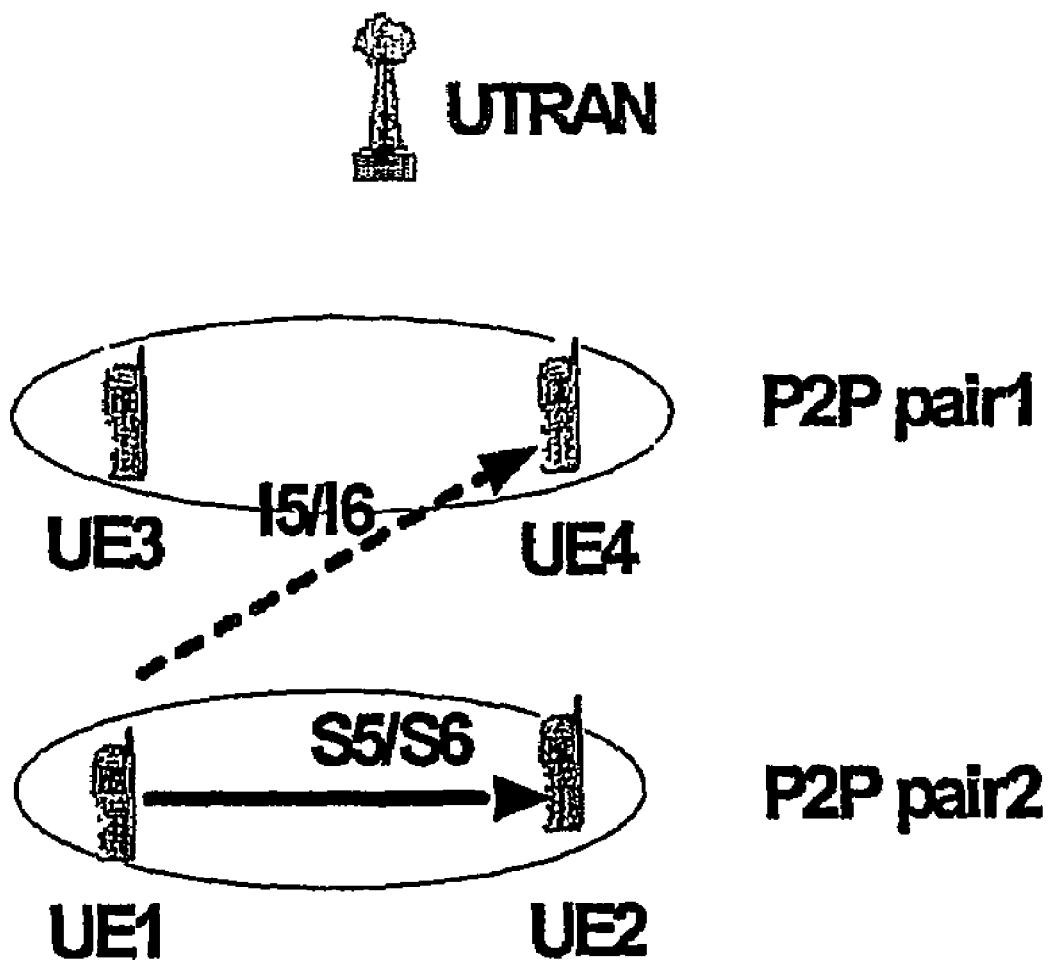
FIG. 5 is a schematic diagram illustrating the generation of interference signals between two direct link pairs in a P2P-enabled TD-SCDMA system.

In similar ways, interference signals I2, I5 and I6 in FIG. 3 and FIG. 5 can all be cancelled according to the timeslot allocation requirement in the second method, so as to guarantee the communication quality of a TD-SCDMA system that introduces P2P communication mode.

A detailed description will be given below to the above second method, in conjunction with FIG. 8, 9 and 10, wherein D is the threshold of the radio range that can be reached by P2P interference signals. When the distance between a P2P UE and another UE exceeds D, they can be allocated in a same timeslot, otherwise they can't be allocated in a same timeslot. The allocation of timeslots can be done once to be reallocated through performing intelligent resource control scheme by the base station system every certain time period Tp whose value can be set according to specific requirement of the network system.

Figure 8:
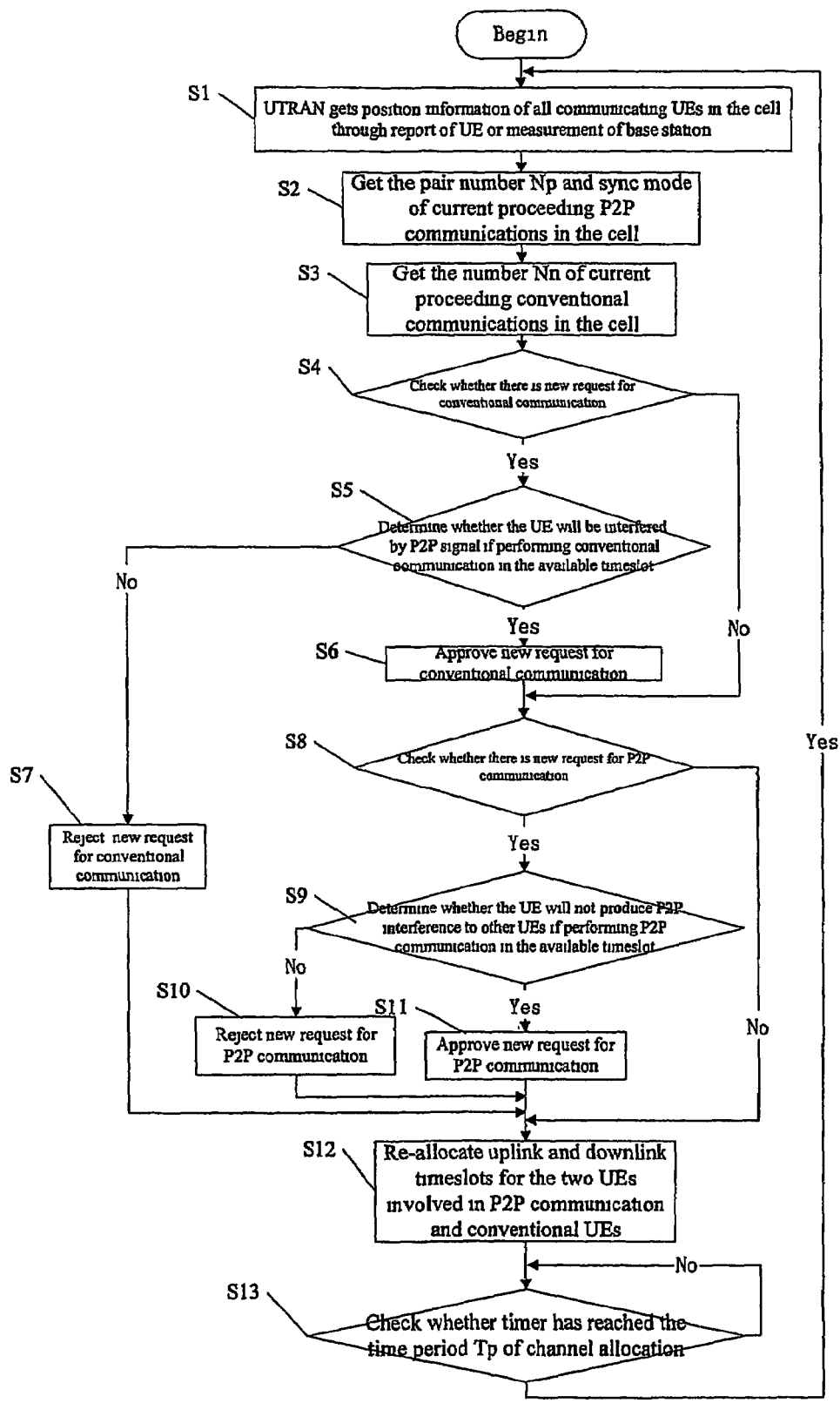
FIG. 8 is a flow chart illustrating resource allocation in accordance with the second method of the present invention.

As FIG. 8 shows, first, the base station system acquires the current resource allocation status in the cell, including the position information of all communicating UEs in the cell (step S1), the pair number Np of P2P communicating UEs in the cell and the synchronization mode (step S2), and the number Nn of current proceeding conventional UEs in the cell (step S3). Wherein: (i) the position information about a UE can be included in the UE's report to the base station or the base station's measurement; (ii) the base station system can distinguish whether UEs in the cell are in P2P communication mode or in conventional communication mode, and restore the information of the UEs in P2P communication mode; (iii) the synchronization mode of each P2P UE also needs to be acquired when the pair number Np of P2P UEs is acquired, because the occupation of uplink timeslot/downlink timeslot in P2P communication can be known only after the synchronization mode of each P2P UE is acquired.

Then, check whether there is a new call request for communicating in conventional UP-UTRAN-DOWN mode from a conventional UE since the intelligent resource control scheme is executed last time (step S4). If there is such a call request, calculate whether there is at least one suitable link timeslot in the several available timeslots according to the position information of the UE, wherein the link timeslot can be an uplink timeslot or a downlink timeslot and the suitable timeslot can still satisfy the communication requirement of the communication network after being allocated to the UE, i.e.: when the UE communicates in conventional mode in said suitable timeslot, it won't be interfered by other P2P communicating UEs in the cell (step S5). This step will be described in detail later in conjunction with FIG. 9. If such a suitable timeslot doesn't exist, reject the new call request from the conventional UE (step S7). If such a suitable timeslot exists, the new call request from the conventional UE will be approved (step S6). For every call request from conventional UEs, iterate the above steps S4 to S7, to approve every conventional call request satisfying the requirement.

After the conventional call request is processed, check whether there is a new call request for communicating in P2P mode from a UE since the intelligent resource control scheme is implemented last time (step S8). If there is such a call request, calculate whether there are at least two suitable timeslots (can be two uplink timeslots or two downlink timeslots or an uplink timeslot and a downlink timeslot) in the several available timeslots, according to the position information about the UE and the other UE (namely the called) involved in P2P communication, wherein the two suitable timeslots can still satisfy the uplink and/or downlink communication requirement of the communication network after being reallocated to the two UEs. That is, when the UE performs P2P communication with the called UE, it won't produce P2P interference to other communicating UEs and other UEs already allocated radio resource (e.g. the above UE whose conventional call request has just been approved) (step S9). This step will be described below in detail in conjunction with FIG. 10. If such suitable timeslots don't exist, reject the new P2P call request from the UE (step S10). If such suitable timeslots exist, the new P2P call request from the UE will be approved (step S11). For every new P2P call request from the UE, iterate the above steps S8 to S11, to approve every P2P call request satisfying the requirement.

After processing the conventional call request and P2P call request, reallocate uplink and downlink timeslots for conventional UEs and two P2P UEs involved in each P2P communication in the cell according to every conventional call request and every P2P call request approved through the above steps, so that each UE can perform conventional and/or P2P communication in the allocated suitable timeslot (step S12).

After the communication resource is reallocated with the above intelligent resource control scheme, enter into a waiting state. When the radio resource reallocation timer reaches the time period Tp of channel allocation, reset the radio resource reallocation timer firstly and restart to time, and then iterate procedures in the above steps S1 to S12 (step S13).

Figure 9:
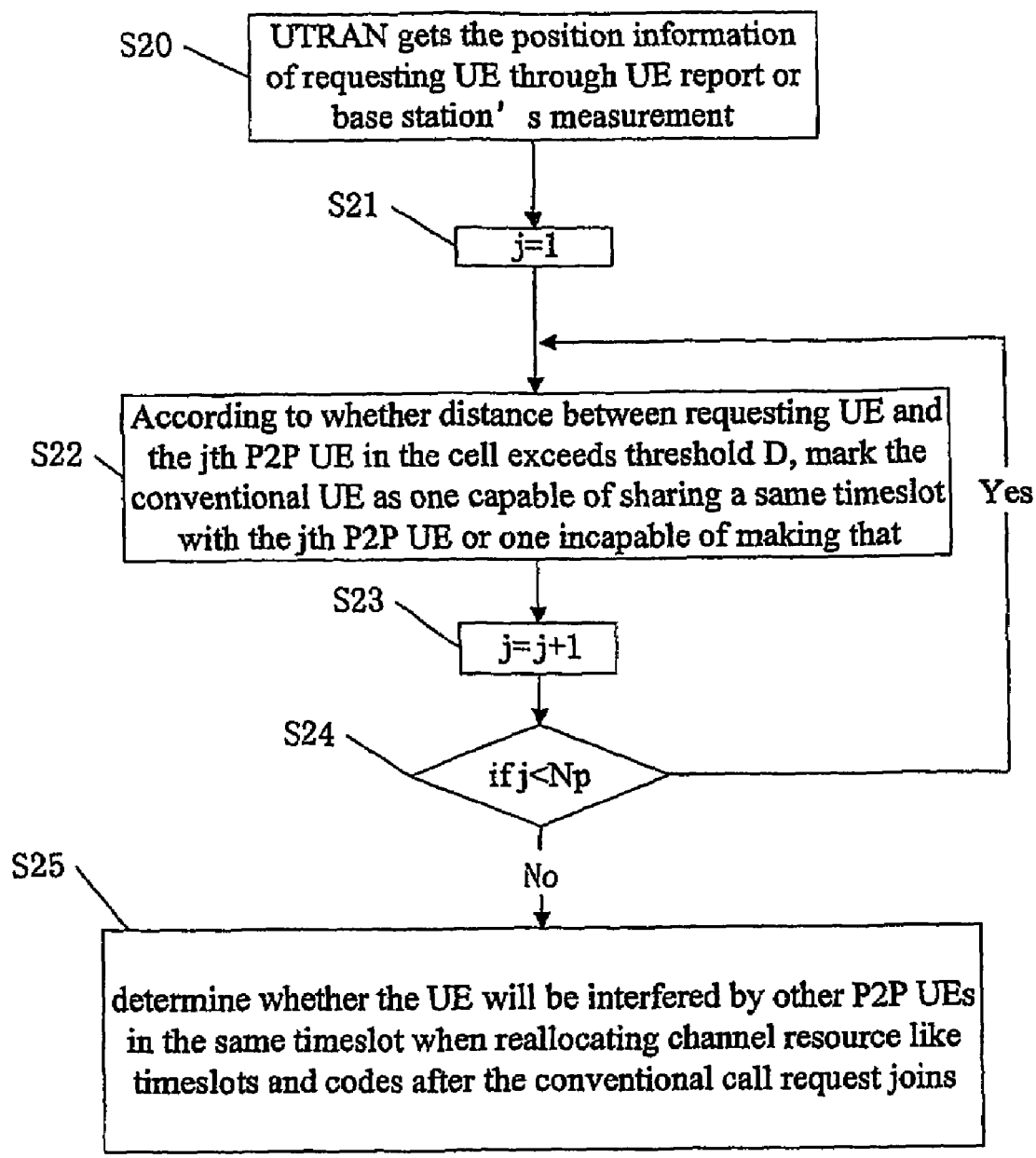
FIG. 9 is a flow char illustrating resource allocation in FIG. 8 when a UE employing conventional communication mode joins.

In FIG. 9, it is described in detail that said suitable timeslot can be determined through computation according to the position information about the UE as above step S5, so that the uplink and downlink communication requirement of the communication network can be satisfied when the UE is allocated to communicate in said suitable timeslot. More specifically as follows:

First, acquire the position information about the UE sending the conventional call request, wherein the position information can be included in the UE's report to the base station, or acquired from the information from UE by the base station system's measurement (step S20).

Then, beginning from the first communicating P2P UE (step S21), calculate the distance between the UE sending conventional call request (called as conventional requesting UE later) and each other P2P communicating UE in the cell respectively (or just calculate the distance between the conventional requesting UE and a part of chosen P2P UEs, wherein the chosen P2P UEs are those communicating with the conventional requesting UE and falling within a certain range). If the distance between conventional requesting UE and a P2P UE exceeds threshold D, mark the conventional requesting UE as one capable of sharing a same timeslot with the P2P UE, that is, categorize the conventional requesting UE into the sharable set of the P2P UE. Otherwise, mark the conventional requesting UE as one incapable of sharing a same timeslot with the P2P UE, that is, categorize the conventional requesting UE into the unshared set of the P2P UE (step S22).

Execute the above marking procedure to each P2P communicating UE in the cell (step S23). After executing the above marking procedure to all P2P communicating UEs in the cell (step S24), taking into account of the channel sharing principle of the above conventional requesting UE and all existing P2P UEs, check whether the radio channel resource such as the reallocated timeslots and codes and the like can still satisfy the uplink and downlink communication requirement, after reconfiguring system if the conventional communication is added. That is, regarding to one or more uplink timeslots and one or more downlink timeslots in the several available timeslots, the UE can share these timeslots with other P2P UEs previously allocated in these timeslots when these timeslots are allocated to the conventional requesting UE (step S25).

Figure 10:
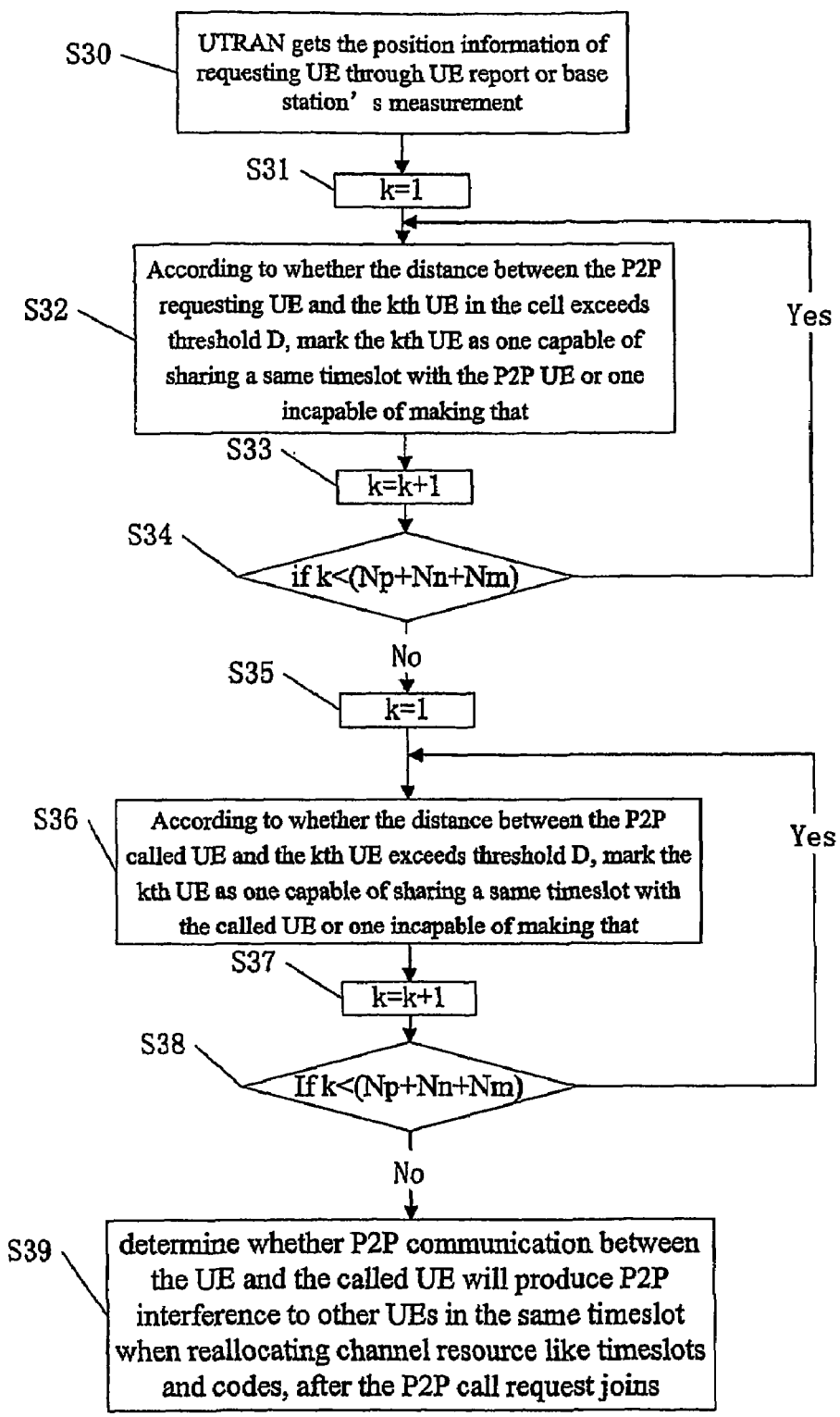
FIG. 10 is a flow char illustrating the resource allocation in FIG. 8 when a UE employing P2P communication mode joins.

In FIG. 10, it is described in detail that said suitable timeslots can be determined through computation according to the position information about the UE as above step S9, so that the uplink and downlink communication requirement of the communication network can be satisfied when the UE is allocated to communicate in said suitable timeslots. More specifically as follows: First, acquire the position information about the UE sending the P2P call request (called as P2P request UB later) and another UE involved in P2P communication. The position information can be included in the information of the UE and the P2P called UE's report to the base station, or acquired from the information from the P2P communication called UE by the base station system's measurement (step S30).

Then, beginning from the first UE already allocated radio resource in the cell (step S31), calculate the distance between the P2P requesting UE and each of other UEs already allocated radio resource in the same cell respectively. These other UEs include: each communicating UE in the cell, and new conventional UEs whose conventional call requests have just been approved through steps S4~S6 in the above FIG. 8. (the total number of the newly approved conventional UEs is denoted as Nm). (Or just calculate the distance between the P2P requesting UE and a part of chosen UEs, wherein the chosen UEs are those having been allocated radio resource and falling within the radio range of the P2P requesting UE). If the distance between the P2P requesting UE and any of the above UEs exceeds threshold D, mark this UE as one capable of sharing a same timeslot with the P2P requesting UE, otherwise mark it as one incapable of sharing a same timeslot with the P2P requesting UE (step S32).

Execute the above marking procedure to each UE already allocated radio resource in the cell (step S33). After executing the above marking procedure to all UBs already allocated radio resource in the cell (step S34), beginning from the first UE allocated radio resource in the cell (step S35), calculate the distance between the called UE involved in the P2P call request and other UEs already allocated radio resource in the same cell respectively. These other UEs include: each communicating UE in the cell, and new conventional UEs whose conventional call requests have just been approved through steps S4~S6 in the above FIG. 8. (the total number of the newly approved conventional UEs is still denoted by Nm). (Or just calculate the distance between the called UE and a part of chosen UEs, wherein the chosen UEs are those having been allocated radio resource and falling within the radio range of the calling UE. )If the distance between the P2P called UE and any of the above UEs exceeds threshold D, mark this UE as one capable of sharing a same timeslot with the P2P called UE, otherwise, mark it as one incapable of sharing a same timeslot with the P2P called UE (step S36). Execute the above marking procedure to each UB already allocated radio resource in the cell (step S37). After executing the above marking procedure to all UEs already allocated radio resource in the cell (step S38), taking into account of the channel sharing principle of the above P2P requesting UE, the P2P called UE and all existing UEs, check whether the radio channel resource such as the reallocated timeslots and codes and the like can still satisfy the uplink and/or downlink communication requirement after reconfiguring system if the P2P call request is added. That is, at least two timeslots in the several available timeslots, the P2P requesting UE and the P2P called UE can share the two timeslots with other UEs previously allocated in the timeslots when the two timeslots are allocated to the P2P requesting UE and the P2P called UE (step S39).

The above method for supporting P2P communication in TD-SCDMA systems in accordance with the present invention as described in conjunction with FIGS. 8, 9 and 10, can be implemented in computer software, or hardware, or in combination of software and hardware.

BENEFICIAL RESULTS OF THE INVENTION

As described above, in the method and apparatus for supporting P2P communication in TD-SCDMA systems provided in the present invention, only those UEs whose distances to P2P UE exceed the P2P radio range of the P2P UE, can be allocated in the same timeslot as the P2P UE, so these UEs sharing a same timeslot can perform their respective communication, without being interfered by transferring P2P signals.

Although the method and apparatus for supporting P2P communication in TD-SCDMA systems provided in the invention has been shown and described with respect to exemplary embodiments of TD-SCDMA, it should be understood by those skilled in the art that the communication method and apparatus are not limited hereof, but also suitable to other TDD CDMA systems.

It is also to be understood by those skilled in the art that the method and apparatus for supporting P2P communication in TD-SCDMA systems disclosed in this invention can be modified considerably without departing from the spirit and scope of the invention as defined by the appended claims.

What is claimed is:

1. A method for canceling interference signals brought by introducing P2P (Peer to Peer) communication in wireless communication systems, performed by a network system, comprising:
  (i) receiving a call request from a user equipment in a cell for communicating in UP-UTRAN-DOWN mode, wherein the requesting user equipment is hereinafter referred to as the requesting UE;
  (ii) judging whether there is an appropriate link timeslot, for which the requesting UE can share a same timeslot with a P2P user equipment allocated with radio resources in the cell, from among several available timeslots for the requesting UE to avoid being interfered by P2P signals transmitted by P2P communicating user equipments allocated with radio resources in a corresponding appropriate shared timeslot when the requesting UE communicates in the appropriate shared timeslot, according to the relative position of the requesting UE and the P2P communicating user equipments in P2P communication in the cell; and
  (iii) approving the call request from the requesting UE and allocating the appropriate shared timeslot to the requesting UE if the appropriate timeslot is available for sharing.

2. The method according to claim 1, wherein step (ii) includes:
  (a) computing the distance between the requesting UE and the P2P communicating user equipments, according to the position information of the requesting UE and the P2P communicating user equipments; and
  (b) allocating the shared timeslot to the requesting UE as an appropriate shared timeslot, if the distance between the P2P communicating user equipments and the requesting UE allocated in the shared timeslot exceeds a predefined threshold, with regard to at least one timeslot to be shared from among said several available timeslots.

3. The method according to claim 1, wherein the P2P communicating user equipments at least include those P2P communicating user equipments in P2P communication in the cell, whose proximity to the requesting UE introduces an interference signal.

4. The method according to claim 3, wherein the call request from the user equipment will be rejected if it's determined in step (ii) that there is no said appropriate timeslot in said several available timeslots for which the requesting UE can share a same timeslot with one of the P2P communicating user equipment allocated with radio resources in the cell.

5. A method for canceling interference signals brought by introducing P2P (Peer to Peer) communication in wireless communication systems, performed by the network system, comprising:
    (I) receiving a call request from a user equipment in a cell for communicating with another user equipment in P2P communication mode in the cell, wherein the requesting user equipment is hereinafter referred to as the requesting P2P UE and the another user equipment is hereinafter referred to as the other P2P user equipment
    (II) judging whether there are at least two appropriate link timeslots for which each of the requesting P2P UE and the other P2P user equipment can share one of at least two appropriate timeslots with each other or with user equipments allocated with radio resources in the cell, from among several available timeslots for the requesting P2P UE and the other P2P user equipment to avoid producing interference of P2P signals to user equipments allocated with radio resources in corresponding appropriate shared timeslots, when the requesting P2P UE and the other P2P user equipment communicating in P2P mode share in the appropriate timeslots, according to the relative position of the a) requesting P2P user equipment and the other P2P user equipment and b) the user equipments allocated with radio resources, and
    (III) approving the call request from the requesting P2P user equipment and allocating said appropriate shared timeslots to the requesting P2P user equipment and the other P2P user equipment if there are appropriate timeslots available for sharing.

6. The method according to claim 5, step (II) comprising:
    (A) computing (i) the distances between the requesting P2P user equipment and the user equipments allocated with radio resources in the cell and (ii) the distances between the other P2P user equipment and the user equipments allocated with radio resources in the cell respectively, according to position information of the requesting P2P user equipment and the other P2P user equipment and that of user equipments allocated with radio resources in the cell;
    (B) allocating the two timeslots to the requesting P2P user equipment and the other P2P user equipment as the appropriate shared timeslots, if the distances between the user equipment allocated with radio resources in respective ones of the two timeslots and the requesting P2P user equipment and the other P2P user equipment exceed a certain threshold, with regard to at least two timeslots to be shared from among said several available timeslots.

7. The method according to claim 5, wherein the user equipments allocated with radio resources in the cell at least include those user equipments allocated with radio resources, whose proximity to the requesting P2P user equipment and said other P2P equipment introduces an interference signal.

8. The method according to claim 7, wherein the call request for P2P communication from the user equipment will be rejected if there are no said appropriate timeslots in said several available timeslots in step (II) for which the requesting P2P UE can share a same timeslot with one of the user equipment allocated with radio resources in the cell.

9. A method for canceling interference signals brought by introducing P2P (Peer to Peer) communication in wireless communication systems, performed by the network system, comprising:
    receiving a call request from a user equipment in a cell, hereinafter referred to as the requesting P2P UE for communicating with another user equipment in P2P communication mode;
    judging whether P2P communication can be established between the requesting P2P user equipment and the other user equipment, according to information of the requesting P2P user equipment and the other user equipment;
    allocating the requesting P2P user equipment and the other user equipment with shared timeslots for forward link and backward link, wherein the shared timeslots occupied respectively by (i) the forward link of the requesting P2P UE and backward link of the other user equipment and (ii) the backward link of the requesting P2P UE and forward link of the other user equipment, are exclusively occupied by the requesting P2P user equipment and the other user equipment, if the requirement for P2P communication establishment can be satisfied.

10. A network system for canceling interference signals brought by introducing P2P communication in wireless communication systems, comprising:
    a receiving means, for receiving a call request from a user equipment in a cell for communicating in UP-UTRAN-DOWN mode, wherein the requesting user equipment is hereinafter referred to as the requesting UE;
    a judging means, for judging whether there is an appropriate link timeslot for which the requesting UE can share a same timeslot with a P2P user equipment allocated with radio resources in the cell, from among several available timeslots for the requesting UE to avoid being interfered by P2P signals transmitted by P2P communicating user equipments allocated with radio resources in a corresponding appropriate shared timeslot when the requesting UE communicates in the appropriate shared timeslot, according to the relative position of the requesting UE and the P2P communicating user equipments communicating in P2P communication mode in the cell; and
    an approving means, for approving the call request from the requesting user equipment when there is an appropriate shared timeslot and allocating the appropriate shared timeslot to the requesting user equipment.

11. The network system according to claim 10, wherein said judging means comprises:
    a computing means, for computing the distance between the requesting user equipment and the P2P communicating user equipments, according to the position information of the requesting user equipment and the P2P communicating user equipments;
    an allocating means, for allocating the shared timeslot to the requesting user equipment as an appropriate shared timeslot, when the distance between the P2P communicating user equipments allocated in the shared timeslot and the requesting P2P user equipment exceeds a predefined threshold, with regard to at least one timeslot to be shared from among several available time slots.

12. The network system according to claim 10, wherein P2P communicating user equipments at least include those P2P communicating user equipments in P2P communication with the requesting user equipment, whose proximity to the requesting user equipment introduces an interference signal.

13. A network system for canceling interference signals brought by introducing P2P communication in wireless communication systems, comprising:

a receiving means, for receiving call request from a user equipment in a cell for communicating with another user equipment in P2P communication mode in the cell, wherein the requesting user equipment is hereinafter referred to as the requesting P2P UE and the another user equipment is hereinafter referred to as the other P2P user equipment;

a judging means, for judging whether there are at least two appropriate link timeslots for which each of the requesting P2P UE and the other P2P user equipment can share one of at least two appropriate timeslots with each other or with user equipments allocated with radio resources in the cell, from among several available timeslots for the requesting P2P user equipment and the other P2P user equipment in P2P communication in the appropriate shared timeslots to avoid producing interference of P2P signals to user equipments allocated with radio resources in the corresponding appropriate shared timeslots, according to the relative position of the a) requesting P2P user equipment and the other P2P user equipment and chosen b) the user equipments allocated with radio resources in the cell;

an approving means, for approving the call request from the requesting P2P user equipment when there are appropriate timeslots available for sharing and allocating the appropriate shared timeslots to the requesting P2P user equipment and the other P2P user equipment.

14. The network system according to claim 13, wherein said judging means comprises:

a computing means, for computing the respective distances between the requesting P2P user equipment and the other P2P user equipment and the user equipments allocated with radio resources in the cell, according to position information of the requesting P2P user equipment and the other P2P user equipment and that of the user equipments allocated with radio resources in the cell; and an allocating means, for allocating the requesting P2P user equipment and the other P2P user equipment with the two timeslots as appropriate shared timeslots, if the distances between the user equipments allocated with radio resources in respective ones of the two timeslots and the requesting P2P user equipment and the other P2P user equipment exceed a certain threshold, with regard to at least two timeslots to be shared from among said several available timeslots.

15. The network system according to claim 13, wherein the user equipments allocated with radio resources in the cell at least include those user equipments allocated with radio resources, whose proximity to the requesting P2P user equipment introduces an interference signal.

16. A network system for canceling interference signals brought by introducing P2P (Peer to Peer) communication in wireless communication systems, comprising:

a receiving means, for receiving call request from a user equipment in a cell, hereinafter referred to as the requesting P2P UE, for communicating another user equipment in P2P communication mode;

a judging means, for judging whether P2P communication between the requesting P2P user equipment and the other user equipment can be established, according to information of the requesting P2P user equipment and the other user equipment;

an allocating means, for allocating the requesting P2P user equipment and the other user equipment with shared timeslots for forward link and backward link, wherein the shared timeslots respectively occupied by (i) the forward link of the requesting P2P UE and backward link of the other user equipment and (ii) the backward link of the requesting P2P UE and forward link of the other user equipment, are exclusively occupied by the requesting P2P user equipment and the other user equipment, if the requirement for establishing P2P communication can be satisfied.

* * * * *